(12) United States Patent
Quartararo et al.

(10) Patent No.: US 12,265,161 B2
(45) Date of Patent: Apr. 1, 2025

(54) SYSTEM AND METHODS FOR FAULT DETECTION IN KALMAN FILTER ESTIMATION

(71) Applicant: The MITRE Corporation, McLean, VA (US)

(72) Inventors: John David Quartararo, Tyngsboro, MA (US); Steven E. Langel, Ashland, MA (US)

(73) Assignee: The MITRE Corporation, McLean, VA (US)

( * ) Notice: Subject to any disclaimer, the term of this patent is extended or adjusted under 35 U.S.C. 154(b) by 531 days.

(21) Appl. No.: 16/805,184

(22) Filed: Feb. 28, 2020

(65) Prior Publication Data

US 2021/0270973 A1    Sep. 2, 2021

(51) Int. Cl.
*G01S 19/23*    (2010.01)

(52) U.S. Cl.
CPC .................................. *G01S 19/23* (2013.01)

(58) Field of Classification Search
CPC ................................ G01S 5/0294; G01S 19/23
See application file for complete search history.

(56) References Cited

U.S. PATENT DOCUMENTS

| | | | | |
|---|---|---|---|---|
| 4,812,995 A * | 3/1989 | Girgis | ...................... | H02H 3/40 324/512 |
| 7,219,013 B1 * | 5/2007 | Young | .................. | G01C 21/165 342/357.58 |
| 7,356,445 B2 * | 4/2008 | Brodie | .................... | G01S 5/021 370/329 |
| 2005/0114023 A1 * | 5/2005 | Williamson | ............ | G01S 19/47 701/472 |
| 2007/0109192 A1 * | 5/2007 | Riley | .................... | G01S 5/0221 342/451 |
| 2010/0027603 A1 * | 2/2010 | Beadle | .................. | G01S 5/0294 375/226 |
| 2011/0223910 A1 * | 9/2011 | Xin | ....................... | H04W 72/02 455/434 |

* cited by examiner

*Primary Examiner* — Kyle R Quigley
(74) *Attorney, Agent, or Firm* — Morrison & Foerster LLP (57) ABSTRACT

Systems and methods for detecting faults in estimator data are provided. In one or more examples, measurements from one or more data sources is received. The received data is used to calculate an innovation which in one or more examples can represent the difference between the received data and an expected value of the data. The innovation can then be used to generate a test statistic which is then accumulated at a plurality of monitors, wherein each monitor of the plurality of monitors is configured to accumulate the test statistic over varying periods of time. The accumulated test statistic at each monitor can be compared against a predefined threshold that is set for each individual monitor. If the accumulated test statistic at any particular monitor is found to be above its corresponding predefined threshold, then the system can alert the user that the received data is likely to be faulty.

21 Claims, 5 Drawing Sheets

Time-series of measurement updates:

SYSTEM AND METHODS FOR FAULT DETECTION IN KALMAN FILTER ESTIMATION

FIELD OF THE DISCLOSURE

This disclosure relates to systems and methods for implementing a fault detection scheme for systems employing Kalman filters. These systems and methods can be used to prevent errant data from being introduced into a Kalman filter, thereby improving the Kalman filter's ability to provide accurate estimates.

BACKGROUND OF THE DISCLOSURE

Kalman filters have long been used to combine data from multiple sensors to provide an estimate of some attribute based on the data from the multiple sensors. A Kalman filter can ingest data from multiple sensors, wherein each sensor's data contains random noise and other inaccuracies, and produce an estimate of unknown variables that are more accurate than if a single sensor was used to produce an estimate of the unknown variable.

The Kalman filter can be used in a wide variety of contexts. One common context is the field of navigation. Multiple sensors can be used to estimate the position of an object over time. For instance, a Global Positioning System (GPS) or global navigation satellite system (GNSS) receiver (sensor) can be used in conjunction with an inertial measurement unit (IMU) to estimate the position in time of an object. Both a GPS sensor and an IMU sensor have noise and inaccuracies associated with their measurements and thus can produce an estimate of the position of an object albeit with some inaccuracy. However, a Kalman filter can be employed to take the measurement from both the GPS sensor and the IMU sensor, and produce an estimate of the position of an object, often times with greater accuracy than if the GPS or IMU sensor were used in isolation.

However, the Kalman filter's ability to produce accurate estimates of position is constrained by the accuracy of the sensor data it uses to generate the estimates. A model of the expected sensor errors is designed and implemented as part of the fundamental Kalman filter algorithm, but if unexpected and therefore unmodeled errors ("faults") are present in the measurements they can taint the estimate of position, unbeknownst to the navigation equipment. For example, if a GPS satellite's clock experienced a timing error that was outside the standard system performance bounds and which was not reflected in the navigation messages encoded on the GPS signal waveform, the navigation equipment can consequently produce a misleading position/time solution. If a Kalman filter ingests faulty sensor data, then the subsequent estimate of position made by the Kalman filter will likely have an error outside the predicted 1-sigma envelope. Faulty data, when ingested by a Kalman filter, can taint the filter's state and can induce non-zero biases on the state estimates. This phenomenon can in turn make the next faulty measurement appear more believable and less likely to be detected as a fault. This feedback effect complicates a purely analytic approach to the analysis of false alarm and missed detection rates.

Making sure that a Kalman filter provides accurate estimates of position can mean making sure that the Kalman filter is using genuine data produced by sensors associated with an object's position. If "faulty" data can be detected and identified, then the data can be excluded for consideration by the Kalman filter when estimating the position of an object.

SUMMARY OF THE DISCLOSURE

Accordingly, systems and methods for fault detection in Kalman filter estimators is provided. In one or more examples, the system and methods can utilize an innovations-based fault detection approach wherein a plurality of innovations monitors are used simultaneously to determine the existence of a fault.

In one or more examples, the systems and methods can calculate an innovation by differencing a current measurement received from a sensor in the system with an expected or predicted value of the measurement produced by a Kalman filter. The calculated innovation can then be put through a series of time-based statistical tests and compared against a pre-determined threshold so as to detect a possible faulty measurement. In one or more examples, the determined faulty measurement can be rejected by the system and not processed by the Kalman filter, thereby preserving the accuracy of the estimates generated by the Kalman filter-based system.

DETAILED DESCRIPTION

In the following description of the disclosure and embodiments, reference is made to the accompanying drawings in which are shown, by way of illustration, specific embodiments that can be practiced. It is to be understood that other embodiments and examples can be practiced and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, could be downloaded to reside on and be operated from different platforms used by a variety of operating systems.

The present invention also relates to a device for performing the operations herein. This device may be specially constructed for the required purposes, or it may comprise a general-purpose computer selectively activated or reconfigured by a computer program stored in the computer. Such a computer program may be stored in a non-transitory, computer-readable storage medium, such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

Described herein are systems and methods for implementing a fault detection scheme to detect faulty sensor data in a Kalman filter-based estimation system. In one or more examples of the disclosure, the systems and methods can implement a monitor bank that includes a plurality of cumulative innovations monitors that can be used in conjunction with one another to detect faults in data received from various sensors in the Kalman filter-based system. The disclosure uses the context of navigation and position estimation to exemplify the disclosure, but the context should not be seen as limiting, and the systems and methods described below can be employed in any context in which a Kalman filter is used to estimate an unknown variable based on a plurality of sensor data.

Modern civilian and military platforms are increasingly utilizing multiple sensors for navigation, most often beginning with a global navigation satellite system (GNSS) or Global Positioning System (GPS) receiver and combining that receiver with an inertial measurement unit (IMU). A Kalman filter remains the most widely used estimator for multi-sensor fusion, and much effort has been placed in designing optimal and robust navigation algorithms that can estimate the position of an object based on the data provided by the GPS and IMU sensor. These algorithms implicitly assume that the GPS sensors and IMU sensors employed in the system are behaving according to predefined measurement models. While navigation systems that employ both GPS sensors and IMU sensors are discussed in detail below, a person of ordinary skill in the art would appreciate that the systems and methods described below can extend naturally to systems that employ any number of sensors.

Figure 1:
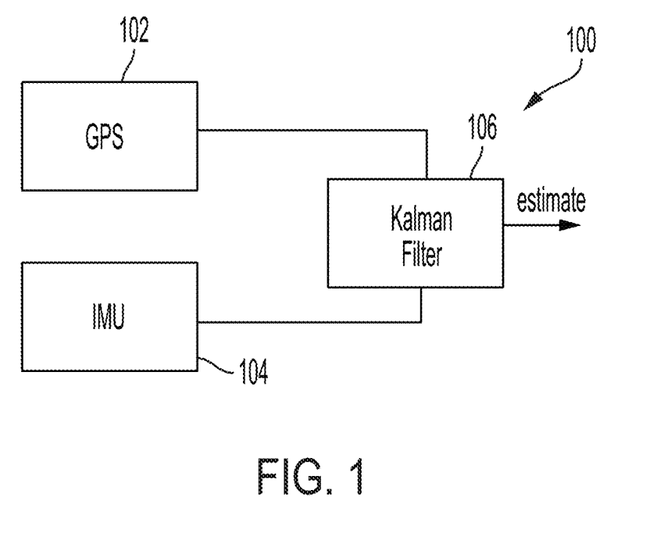
FIG. 1 illustrates an exemplary Kalman filter-based position estimation system according to examples of the disclosure.

FIG. 1 illustrates an exemplary Kalman filter-based position estimation system according to examples of the disclosure. The example of FIG. 1 illustrates an exemplary system 100 that can include a GPS sensor 102 and an IMU sensor 104. GPS sensors, such as those depicted at 102 transmit data to a receiver to indicate the position of an object. However, the data received can be corrupted by noise coming in the form of measurement error, channel noise, and other sources of noise known in the art. Likewise, IMU sensor measurements, such as that depicted at 104, can be transmitted to a receiver and be utilized to indicate the position of an object. However, the data received can be corrupted by noise coming in the form of measurement error, like that of the GPS sensor.

In one or more examples, both the GPS sensor 102 and the IMU sensor 104 can be directly compared with one another to determine the likely position of an object. However, direct comparison between a GPS position estimate and one obtained from an IMU can only be effective for short duration applications because IMU based positioning estimates degrade over time. In order to effectively leverage multi sensor data collection to estimate the position of an object, a method can be employed that estimates the position of an object based on the received data from the sensors, and an understanding of the various noise sources that are associated with each sensor.

Thus, in one or more examples, a system 100 can include a Kalman filter 106 that can leverage both sensors 102 and 104 to determine the position of an object. A Kalman filter is a method that utilizes linear quadratic estimation to generate estimates of the position of an object based not only on the currently received measurements, but also the measurements previously received. Kalman filter 106 can thus receive measurement data from GPS sensor 102 and IMU sensor 104 and generate at its output an estimate of the position of the object that is being tracked.

Systems such as the one depicted in FIG. 1 can be used to estimate the position of the object more accurately than just using the sensors themselves because the Kalman filter can take into account previous measurements as well as a priori knowledge of the noise characteristics of each sensor to generate a more accurate estimate. However, the Kalman filter's recursive nature, in that it relies on previously received measurements, can make it susceptible to producing inaccurate estimates, particularly in the case of a pernicious, slowly-accumulating measurement fault which occurs over some period of time as opposed to an abrupt and large error that is easily detected and discarded.

Figure 2:
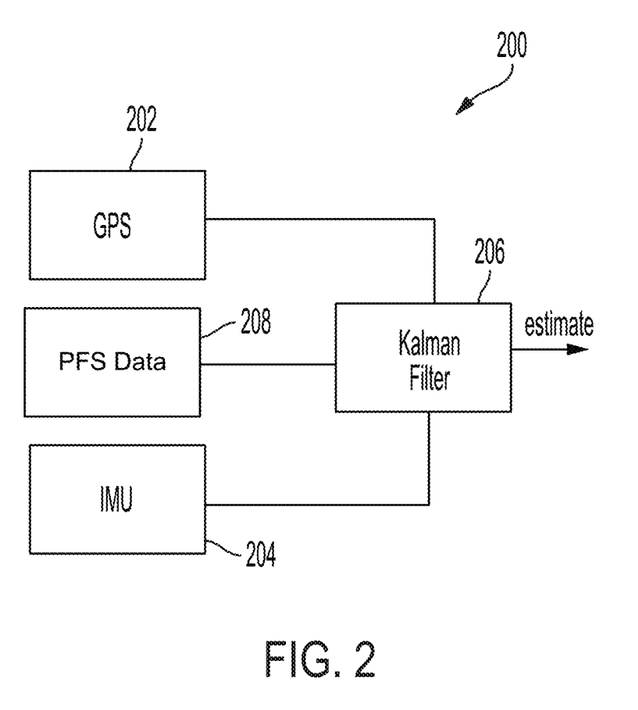
FIG. 2 illustrates an exemplary Kalman filter based estimation system in which faulty GPS data is provided to the Kalman filter according to one or more examples of the disclosure.

In one or more examples of the disclosure, a pernicious fault source (PFS) could provide to the Kalman filter faulty GPS data with the goal of inducing the Kalman filter to estimate a false trajectory of the object. FIG. 2 illustrates an exemplary Kalman filter-based estimation system in which faulty GPS data is provided to the Kalman filter according to one or more examples of the disclosure. In the system 200 of FIG. 2, the GPS sensor 202 and the IMU sensor 204 can provide data to Kalman filter 206 as discussed above with respect to FIG. 1 above. However, in the example of FIG. 2, a PFS of bad GPS data (e.g., malfunctioning satellite, control segment error) 208 can also transmit faulty GPS data to the Kalman filter 206.

As discussed above, Kalman filters such as Kalman filter 206 can use currently received data as well as past data and past estimates to generate current estimates of the position of the object. Thus, if faulty measurements are received by the Kalman filter from a PFS 208, then not only will the current estimate generated by the Kalman filter be inaccurate, but future estimates can also be inaccurate due to the Kalman filter's use of prior estimates to generate current estimates.

One strategy that can be employed to ensure that faulty data does not cause the Kalman filter to generate current and future inaccurate estimates is to try and prevent the faulty data from entering into the Kalman filter's estimation algorithm. In order to prevent the faulty data from entering the Kalman filter, it thus can become prudent to have a method to identify data as faulty, and then reject that data from being used by the Kalman filter to generate position estimates. In other words, imparting the system with a method for detecting faults with the data being received before the data is provided to a Kalman filter can substantially improve the performance of the Kalman filter in environments in which there are attempts to provide the Kalman filter with faulty data.

Figure 3:
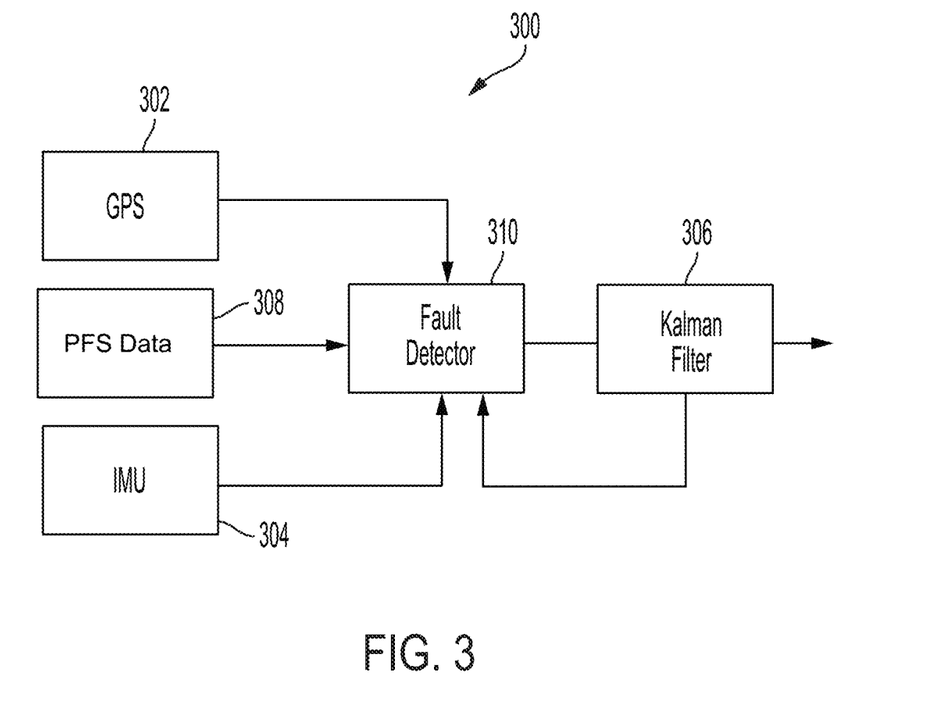
FIG. 3 illustrates an exemplary Kalman filter-based position estimation system with a fault detector according to examples of the disclosure.

FIG. 3 illustrates an exemplary Kalman filter-based position estimation system with a fault detector according to examples of the disclosure. In the example of FIG. 3, system 300 can include similar components to the example of FIG. 2. For instance, system 300 can include a GPS sensor 302, IMU sensor 304, Kalman filter 306, and a PFS 308 transmitting a faulty GPS signal, that operate in substantially the same manner as their counterparts 202, 204, 206, and 208 respectively from FIG. 2. Thus, a description of the operation of elements 302, 304, 306, and 308 can be referenced above with respect to their counterparts from the example of FIG. 2.

In addition to the above described components, the system 300 can also include a fault detector 310. Fault detector 310 can be used to identify "faulty" data and can also be used to reject that faulty data so that it is not sent to the Kalman filter where it could be used to determine an estimate of the position of an object being tracked. As shown in FIG. 3, the fault detector 310 can be communicatively coupled to Kalman filter 306 so that, and as described in detail below, Kalman filter 306 can provide information to the fault detector 310 that the fault detector can use to help it detect the presence of faulty data such as that being sent from the PFS 308. While in the example of FIG. 3, fault detector 310 is illustrated as being a separate component from Kalman filter 306, in one or more examples, fault detector 310 can be integrated into Kalman filter 306.

As described above, a Kalman filter like the one depicted at 306, can generate at its output an estimate of the position of an object based on the data received from a GPS sensor. Additionally, and as is known in the art, a Kalman filter can also generate predictions of the measurements it takes in at its input. Thus, in the example of FIG. 3, when the Kalman filter 306 generates an estimate of the position of the object, it can also generate estimates of the measured GPS sensor value. The estimates of the measured GPS sensor value can serve as predictions of the actual values received from GPS sensor 302.

In one or more examples, and as known in the art, the predicted measurement value can be generated based on the previous state estimate (aka the a priori state estimate) (i.e., what the Kalman filter previously estimated the position of the object to be) as well as a previously stored dynamic model of the motion of the object that can be pre-configured in the Kalman filter by a user. This dynamic model of motion might be based on physics equations or, in the case of IMU integration, the IMU measurements in conjunction with navigation equations to drive the state propagation. Thus, in one or more examples, and using the previously configured dynamic model of motion, the Kalman filter can estimate what each measurement should be at a given moment in time. For instance, if 10 seconds has passed since the Kalman filter 306 generated the last state estimate, then using the IMU measurements, the prior state estimate, and the amount of time that has elapsed, the Kalman filter can generate estimates of what the data from the GPS sensor 302 should currently read.

In addition to being preconfigured with a dynamic model of the motion of an object as described above, Kalman filter 306 can also be preconfigured with the noise profiles of each of the sensors it takes readings from. The noise profiles can be configured in the Kalman filter 306 as a time-varying covariance matrix which, as will be described in further detail below, can be used by the fault detector 310 to aid in the detection of faults.

In one or more examples, the Kalman filter 306 can transmit back to the fault detector 310 the previous state estimate, predictions of the measurements that are received by the Kalman filter and any given moment in time, as well as noise information for each sensor in the form of a covariance matrix. The fault detector 310 can use these values from the Kalman filter to detect faults, as will be described in further detail below.

One known method to detect faults is to simply compare the received measurements with the estimates of those measurements generated by the Kalman filter 306, and as described above. One method of comparison is to take the difference between the actual measurements and the estimates of those measurements generated by the Kalman filter 306. The result of the differencing of the measurements with the estimates of the measurements can be referred to as an "innovation." As described in further detail below, an innovation can be used in fault detection to detect faults with the data that has been received.

In one or more examples, an innovation can be used to generate a "snapshot innovations monitor" that can monitor received data to detect the presence of faults. To mathematically illustrate how an innovations monitor can be used to detect a fault, we label an innovation as $y_k$. Using the innovation $y_k$, which because there are multiple measurement can be represent as a vector, a test statistic can be generated that can ultimately be compared against a predetermined threshold to detect the presence of a fault. In one or more examples the test statistic can be represented by equation 1 below.

$$s_k = y_k^T S_k^{-1} y_k \qquad \text{Equation 1}$$

In equation 1 above, $s_k$ can represent the calculated test statistic, $y_k$ can represent the calculated innovation, and $S_k$ can represent the innovation covariance matrix. The innovation covariance matrix, in one or more examples, can be generated by the Kalman filter itself. As described above, each measurement source can have a noise profile (i.e., a variance) associated with it. Thus, the innovation covariance matrix will also have a noise profile associated with it that is based on the noise profiles of the sensors being utilized by the Kalman filter. In one or more examples, each sensor measurement can have a noise profile that can be represented with a Gaussian random variable that is zero mean and has a particular variance. Since the Kalman filter is natively linear or can be linearized, as in the case of an extended Kalman filter, the innovation vector can also be modeled as a Gaussian random vector that can be described by a covariance matrix.

Thus, equation 1 above, essentially takes the current innovation and forms a weighted normalization such that the innovation vector is converted into a scalar test statistic. Because the innovation is normalized by the inverse of the covariance matrix of the innovation, the test statistic can thus be modeled as a chi-squared random variable. Referring back to equation 1 above, $s_k$ (i.e., the test statistic) can be modeled as a chi-squared random variable. In one or more examples, in a snapshot innovations monitor, the generated test statistic can be compared against a predetermined threshold to determine if there is a potential fault with the data that has been received from the sensors, such as GPS sensor 302 and IMU sensor 304.

In one or more examples, the threshold can be based on a predetermined acceptable false alarm probability and the number of degrees of freedom m which is proportional to the number of accumulations and measurements (i.e., how many innovations have been accumulated and the number of measurements that comprise those innovations). Thus, for example, given a required minimum false alarm probability $P_{fa}$, a threshold T can be determined from equation 2 below.

$$T_k = F_{\chi_m^2}^{-1}(1 - P_{fa}) \qquad \text{Equation 2}$$

In equation 2 above, $T_k$ can represent the threshold value, $F_{x2m}^{-1}$ can represent the central chi-square inverse cumulative distribution function, and $P_{fa}$ can represent the predetermined acceptable probability of false alarm. In the example of the snapshot monitor, the calculated $s_k$ (i.e., the test statistic) can be compared with $T_k$ to determine whether a potential fault exists in the received data.

While the process described above with respect to equations 1 and 2 can be used to detect faults in data, the snapshot innovations monitor can have its limitations. A snapshot innovations monitor may be well-suited to detecting sudden and large faults, but it may not be able to pick up subtly growing faults (e.g., a sensor failure which occurs over a longer time scale). If these subtle faults are not detected, the bias they induce in the Kalman filter estimate can accumulate and may cause the Kalman filter to produce unacceptably inaccurate estimates of the position of an object.

One way to counteract the above phenomenon is to accumulate the normalized innovations over time and compare the accumulated innovations to an accumulated threshold to determine the presence of faulty data. Such a system can be referred to as an infinite horizon innovations monitor. The infinite horizon innovations monitor can generate a cumulative test statistic that can be compared against a cumulative threshold to detect the presence of one or more faults. Equation 3 below can mathematically represent the infinite horizon innovations monitor.

$$s_k = \sum_{i=1}^{k} y_i^T S_i^{-1} y_i \qquad \text{Equation 3}$$

The innovations vector y is uncorrelated through time, meaning that $s_k$ (which now represents the cumulative test statistic) is chi-square distributed. Therefore, the design and analysis of the infinite horizon monitor (i.e., setting thresholds) is identical to the snapshot monitor. While the infinite horizon innovations monitor can be effective at detecting subtle faults over time, given that the degrees of freedom increases ad infinitum, the monitor can become increasingly sensitive to model uncertainty with time. Thus, in a context in which an object may be traveling for a long duration of time, the infinite horizon monitor may not be well suited to detect faults or may be too error prone for a longer duration mission.

The snapshot innovations monitor may be well-suited to detect sudden faults, and the infinite horizon monitor's usefulness may be hampered by its performance over time due to model uncertainty sensitivity. Thus, in one or more examples, rather than allowing the innovations to accumulate over infinity, in one or more examples, the innovations can be accumulated over a pre-determined period of time (i.e., a sliding window) to detect faults. This finite duration innovations monitor can eschew the limitations of both the snapshot monitor and the infinite horizon monitor. However, picking a duration that can accurately detect subtle faults over time, without degrading over time like the infinite horizon monitor can present a challenge. A single duration monitor may be well-suited to pick up subtle faults but may not be well suited to detect sudden faults if the duration is high. If the duration is picked to be too low, the monitor may be well suited to detecting sudden faults but may miss more subtle faults.

Figure 4:
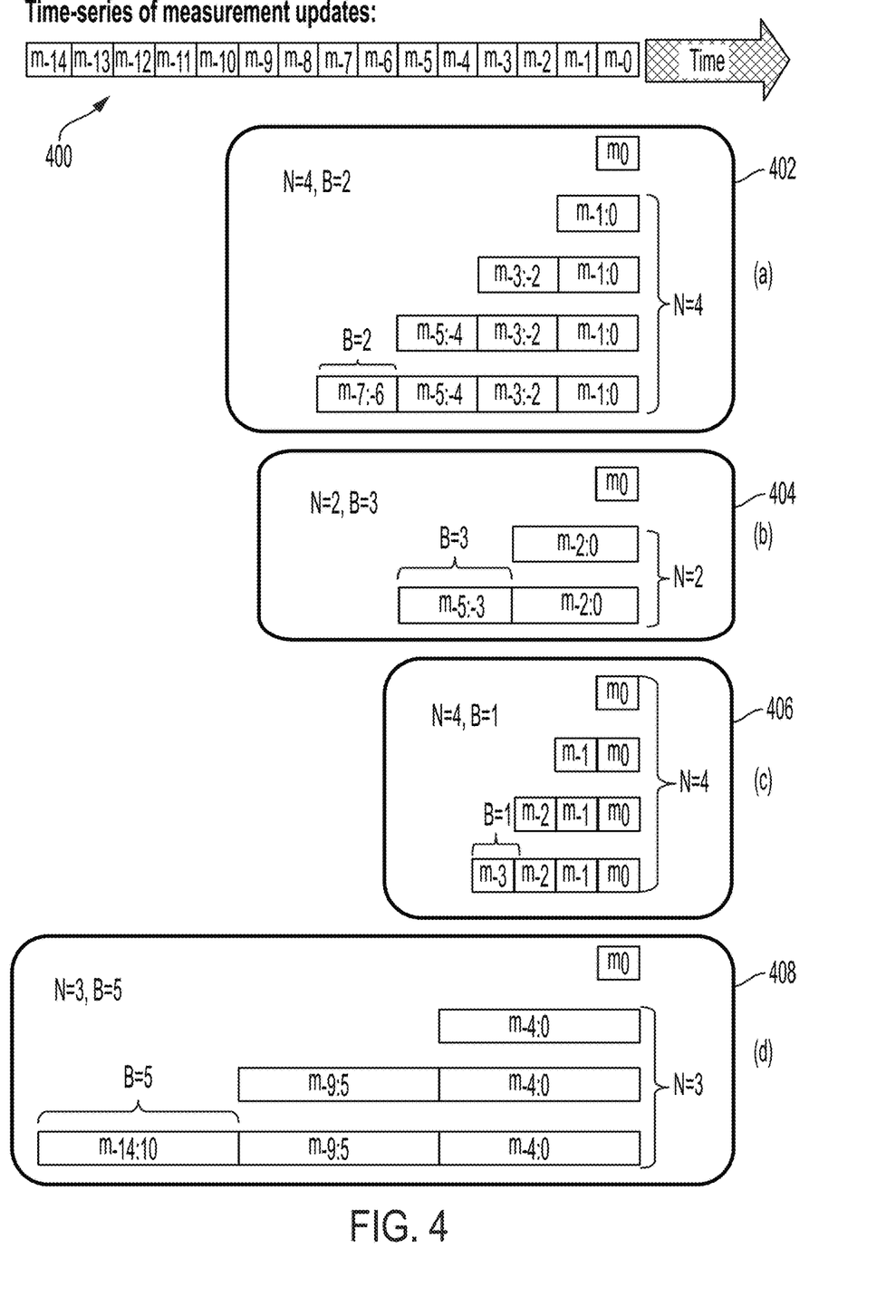
FIG. 4 illustrates an exemplary innovations monitor bank detection scheme according to examples of the disclosure.

Thus, in one or more examples, rather than picking a single accumulation duration, the examples of the present disclosure can utilize a plurality of monitors (i.e., a monitor bank) that accumulate over different time durations to detect the presence of a fault. FIG. 4 illustrates an exemplary innovations monitor bank detection scheme according to examples of the disclosure. In the example of FIG. 4, element 400 can represent a time-series of measurement updates, with each box of element 400 representing a collection of received measurements at a specific time. FIG.

4 illustrates four separate monitor bank schemes 402, 404, 406, and 408. Turning to the example of monitor bank scheme 402, the value N can represent the number of monitors in the scheme. Thus, in the example of monitor bank scheme 402, the value N can be set to 4. N can be predefined by a user of the system. The user can also define the value B which can represent the number of measurement updates that are used to generate a test statistic. Thus, in the example of monitor bank scheme 402, B can be equal to 2.

In the example of monitor bank scheme 402, when a measurement update (labeled as $m_0$) is received it can be added to each monitor (i.e., the four monitors determined by N). The first monitor can generate a test statistic based on the accumulation of the innovations associated with $m_0$ and $m_{-1}$ (i.e., the previously received measurement) since B=2. The second monitor of monitor bank scheme 402 can accumulate the test statistics associated with the current measurement $m_0$ and $m_{-1}$ and the test statistics of measurements $m_{-2}$ and $m_{-3}$ (i.e., the two windows). This pattern can continue for all 4 monitors in the monitor scheme 402 (i.e., the third monitor can contain 3 windows, and the fourth monitor can include 4 windows). Monitor bank schemes 404, 406, and 408 can illustrate different configurations of the monitor bank when N and B are varied by the user.

When a new measurement is received, a new test statistic can be generated that utilizes the new measurement for each monitor in the bank. The newly generated test statistic can be compared against a threshold similar to what is discussed above for the infinite horizon monitor and is based on the number of measurements included in the test statistic (i.e., the chi-squared threshold can have the appropriate degrees of freedom associated with the number of normalized innovations that are accumulated). In one or more examples, the $P_{fa}$ used to compute each monitor's threshold can be determined by dividing the overall monitor bank's $P_{fa}$ by the number of monitors in the bank. Alternatively, the $P_{fa}$ can be allocated in any manner so long as the distribution of $P_{fa}$ allows for the $P_{fa}$ of the entire bank to be within the overall limit. If any of the generated test statistics are above their associated thresholds, then the fault detector 310 of FIG. 3 can indicate a fault.

Figure 5:
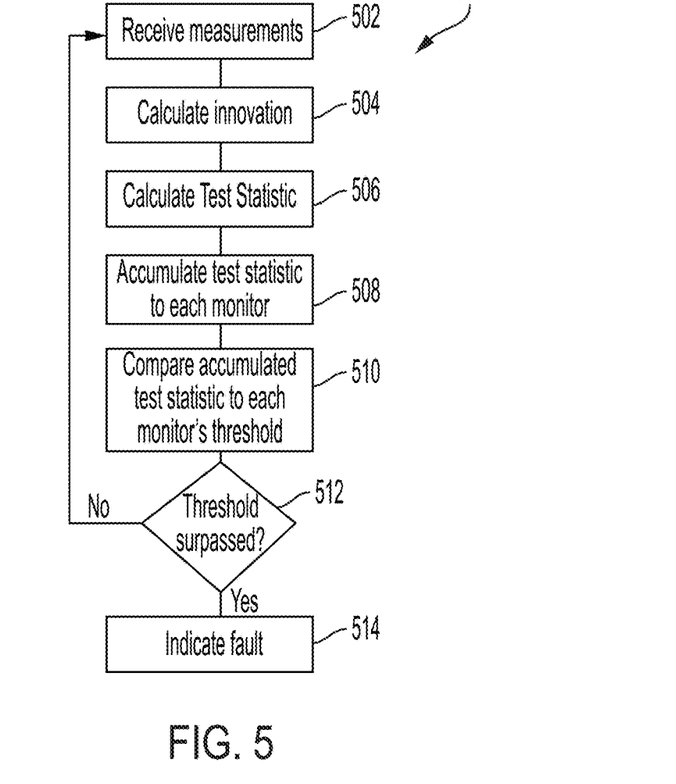
FIG. 5 illustrates an exemplary process for implementing a fault detection scheme that utilizes an innovations monitor bank approach according to examples of the disclosure.

FIG. 5 illustrates an exemplary process for implementing a fault detection scheme that utilizes an innovations monitor bank approach according to examples of the disclosure. In the example of FIG. 5, the process 500 can begin at step 502 wherein the measurements from the various sensors in the Kalman filter-based estimation scheme are received. Using the example of FIG. 3, step 502 can correspond to the instance when the fault detector 310 receives the measurements from GPS sensor 302.

Once the measurements are received at step 502, the process can then move to step 504 wherein an innovation is calculated for the received measurement as described above. Once the innovation is calculated at step 504, the process can then move on to step 506 wherein a test statistic is calculated using the newly generated innovation calculated at step 504. As described above with respect to FIG. 4, the test statistic can utilize multiple innovations depending on the value of B.

In one or more examples, once the test statistic is calculated at step 506, the process can move to step 508 wherein the newly generated test statistic is accumulated at each individual monitor in the bank. Using the example of FIG. 4, the newly generated test statistic can be accumulated in each of the four monitors in the monitor bank scheme 402, since N is set to four.

Once the test statistic has been accumulated to each monitor in the monitor bank at step 508, the process 500 can move on to step 510 wherein each accumulated test statistic is compared to its corresponding threshold, as described above with respect to FIG. 4. The process 500 can then move on to step 512 wherein a determination is made as to whether any threshold of any of the monitors in the monitor bank scheme has been surpassed. If none of the thresholds have been surpassed, then no fault will be indicated, and the process 500 can revert back to step 502 to receive new measurements. However, if at step 512 it is determined that one or more of the thresholds have been surpassed, then the process can move to step 514 wherein a fault is indicated. In one or more examples, at step 514, indication of a fault can come in the form of a notification to the user that there was a fault, or a notification to the Kalman filter system that a fault has occurred.

In the event that a fault has been detected at step 514, the system can take various actions to mitigate the fault. For instance, if the threshold of a particular monitor is surpassed, then that can indicate that fault has occurred within the past time duration of that particular monitor. Thus, if a particular monitor for example is accumulating test statistics over a ten minute period, then if the threshold is surpassed at that monitor, it can indicate that faulty data has been acquired at some or multiple points within that ten minute window. Thus, in order to mitigate the fault, the system can "rewind" the filter state back ten minutes and redo the state propagation but without the faulty measurements, thus rejecting the previous measurements collected over the ten minute window.

The system and methods described above can allow for a Kalman filter-based system to detect faults over varying time windows thus providing a robust process for detecting faults that can simultaneously detect sudden large faults, as well as subtle faults occurring over a period of time.

Figure 6:
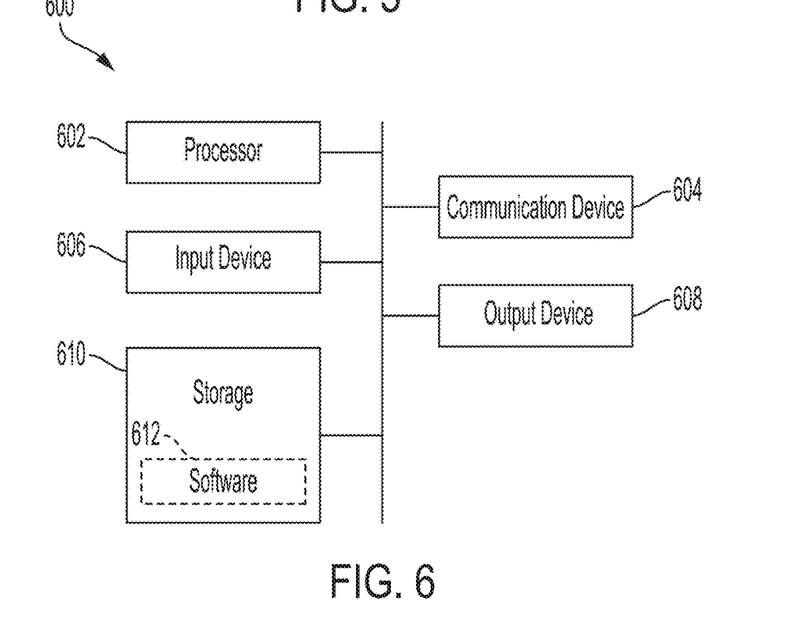
FIG. 6 illustrates an example of a computing device in accordance with one embodiment.

FIG. 6 illustrates an example of a computing device in accordance with one embodiment. Device 600 can be a host computer connected to a network. Device 600 can be a client computer or a server. As shown in FIG. 6, device 600 can be any suitable type of microprocessor-based device, such as a personal computer, workstation, server, or handheld computing device (portable electronic device), such as a phone or tablet. The device can include, for example, one or more of processors 602, input device 606, output device 608, storage 610, and communication device 604. Input device 606 and output device 608 can generally correspond to those described above and can either be connectable or integrated with the computer.

Input device 606 can be any suitable device that provides input, such as a touch screen, keyboard or keypad, mouse, or voice-recognition device. Output device 608 can be any suitable device that provides output, such as a touch screen, haptics device, or speaker.

Storage 610 can be any suitable device that provides storage, such as an electrical, magnetic, or optical memory, including a RAM, cache, hard drive, or removable storage disk. Communication device 604 can include any suitable device capable of transmitting and receiving signals over a network, such as a network interface chip or device. The components of the computer can be connected in any suitable manner, such as via a physical bus or wirelessly.

Software 612, which can be stored in storage 610 and executed by processor 602, can include, for example, the programming that embodies the functionality of the present disclosure (e.g., as embodied in the devices as described above).

Software 612 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 610, that can contain or store programming for use by or in connection with an instruction execution system, apparatus, or device.

Software 612 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 600 can implement any operating system suitable for operating on the network. Software 612 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

According to some examples of the disclosure, the systems and methods can include a device for detecting and rejecting faulty data in an estimation scheme, the device comprising: an input configured to receive data, a memory, one or more processors, wherein the one or more processors are configured to execute instructions stored on the memory that when executed by the processor, cause the device to: receive one or more measurements from one or more sensors at the input, calculate an innovation based on the one or more received measurements, wherein an innovation is based on the received one or more measurements and an expected value of the one or more received measurements, calculate a test statistic based on the calculated innovation, wherein the calculated test statistic is based on the calculated innovation and noise information about the calculated innovation, accumulate the calculated test statistic at one or more monitors, wherein each of the one or more monitors is configured to accumulate the calculated test statistic over one or more predefined time periods, compare each of the accumulated one or more test statistics of a monitor of the one or more monitors with one or more pre-defined thresholds, wherein each of the one or more pre-defined thresholds corresponds to a monitor of the one or more monitors, and if the one or more of the accumulated test statistics of a monitor is greater than its corresponding pre-defined threshold of the one or more pre-defined thresholds: alert a user of the device to the presence of a fault with the received one or more measurements. In one or more examples, the one or more processors are further configured to: if none of the one or more of the accumulated test statistics of a monitor is greater than its corresponding pre-defined threshold of the one or more pre-defined thresholds: transmit the received one or more estimates to an estimator, wherein the estimator produces an estimate of a value based on previous estimates of the value and one or more measurements received by one or more sensors. In one or more examples, the estimator is a Kalman filter. In one or more examples, the calculated innovation is based on a difference between the one or more received measurements and the expected value of the one or more received measurements. In one or more examples, the noise information about the calculated innovation includes a covariance matrix of the innovation. In one or more examples, the noise information includes a covariance matrix of the innovation, and wherein the test statistic is calculated by multiplying the calculated innovation with the covariance matrix of the innovation. In one or more examples, each monitor of the one or more monitors accumulates the test statistic over a predefined period of time set by a user of the device. In one or more examples, each monitor can update the test statistic based on a predefined number of received measurements, and wherein the predefined number of received measurements is set by the user of the device. In one or more examples, the predefined threshold is based on a probability of false alarm, wherein the probability of false alarm represents the probability that the one or more of the accumulated test statistics of a monitor is greater than its corresponding pre-defined threshold of the one or more pre-defined thresholds and the one or more measurements do not contain faults. In one or more examples, the one or more received measurements are received from a GPS transmitter.

According to some examples of the disclosure, the systems and methods can include a method for detecting and rejecting faulty data in an estimation scheme, the method comprising: receiving one or more measurements from one or more sensors at an input, calculating an innovation based on the one or more received measurements, wherein an innovation is based on the received one or more measurements and an expected value of the one or more received measurements, calculating a test statistic based on the calculated innovation, wherein the calculated test statistic is based on the calculated innovation and noise information about the calculated innovation, accumulating the calculated test statistic at one or more monitors, wherein each of the one or more monitors is configured to accumulate the calculated test statistic over one or more predefined time periods, comparing each of the accumulated one or more test statistics of a monitor of the one or more monitors with one or more pre-defined thresholds, wherein each of the one or more pre-defined thresholds corresponds to a monitor of the one or more monitors, and if the one or more of the accumulated test statistics of a monitor is greater than its corresponding pre-defined threshold of the one or more pre-defined thresholds: alerting a user of the device to the presence of a fault with the received one or more measurements. In one or more examples the method further comprises: if none of the one or more of the accumulated test statistics of a monitor is greater than its corresponding pre-defined threshold of the one or more pre-defined thresholds: transmitting the received one or more estimates to an estimator, wherein the estimator produces an estimate of a value based on previous estimates of the value and one or more measurements received by one or more sensors. In one or more examples, the estimator is a Kalman filter. In one or more examples, the calculated innovation is based on a difference between the one or more received measurements and the expected value of the one or more received measurements. In one or more examples, the noise information about the calculated innovation includes a covariance matrix of the innovation. In one or more examples, the noise information includes a covariance matrix of the innovation, and wherein the test statistic is calculated by multiplying the calculated innovation with the covariance matrix of the innovation. In one or more examples, each monitor of the one or more monitors accumulates the test statistic over a predefined period of time set by a user of the device. In one or more examples, each monitor can update the test statistic based on a predefined number of received measurements, and wherein the predefined number of received measurements is set by the user of the device. In one or more examples, the predefined threshold is based on a probability of false alarm, wherein the probability of false alarm represents the probability that the one or more of the accumulated test statistics of a monitor is greater than its corresponding pre-defined threshold of the one or more pre-defined thresholds and the one or more measurements do not contain faults. In one or more examples, the one or more received measurements are received from a GPS transmitter.

According to some examples of the disclosure, the systems and methods include a non-transitory computer readable storage medium storing one or more programs, the one or more programs comprising instructions for detecting and rejecting faulty data in an estimation scheme, when executed by the portable electronic device causes the portable electronic device to: receive one or more measurements from one or more sensors at an input, calculate an innovation based on the one or more received measurements, wherein an innovation is based on the received one or more measurements and an expected value of the one or more received measurements, calculate a test statistic based on the calculated innovation, wherein the calculated test statistic is based on the calculated innovation and noise information about the calculated innovation, accumulate the calculated test statistic at one or more monitors, wherein each of the one or more monitors is configured to accumulate the calculated test statistic over one or more predefined time periods, compare each of the accumulated one or more test statistics of a monitor of the one or more monitors with one or more pre-defined thresholds, wherein each of the one or more pre-defined thresholds corresponds to a monitor of the one or more monitors, if the one or more of the accumulated test statistics of a monitor is greater than its corresponding pre-defined threshold of the one or more pre-defined thresholds: alert a user of the device to the presence of a fault with the received one or more measurements. In one or more examples, the device is further caused to: if none of the one or more of the accumulated test statistics of a monitor is greater than its corresponding pre-defined threshold of the one or more pre-defined thresholds: transmit the received one or more estimates to an estimator, wherein the estimator produces an estimate of a value based on previous estimates of the value and one or more measurements received by one or more sensors. In one or more examples, the estimator is a Kalman filter. In one or more examples, the calculated innovation is based on a difference between the one or more received measurements and the expected value of the one or more received measurements. In one or more examples, the noise information about the calculated innovation includes a covariance matrix of the innovation. In one or more examples, the noise information includes a covariance matrix of the innovation, and wherein the test statistic is calculated by multiplying the calculated innovation with the covariance matrix of the innovation. In one or more examples, wherein each monitor of the one or more monitors accumulates the test statistic over a predefined period of time set by a user of the device. In one or more examples, each monitor can update the test statistic based on a predefined number of received measurements, and wherein the predefined number of received measurements is set by the user of the device. In one or more examples, the predefined threshold is based on a probability of false alarm, wherein the probability of false alarm represents the probability that the one or more of the accumulated test statistics of a monitor is greater than its corresponding pre-defined threshold of the one or more pre-defined thresholds and the one or more measurements do not contain faults. In one or more examples, wherein the one or more received measurements are received from a GPS transmitter.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

What is claimed is:

1. A device for detecting and rejecting faulty data in an estimation scheme, the device comprising:
an input configured to receive data;
a memory;
one or more processors, wherein the one or more processors are configured to execute instructions stored on the memory that when executed by the processor, cause the device to:
receive one or more measurements from one or more sensors at the input;

calculate an innovation based on the one or more received measurements, wherein an innovation is based on the received one or more measurements and an expected value of the one or more received measurements;

calculate a test statistic based on the calculated innovation, wherein the calculated test statistic is based on the calculated innovation and noise information about the calculated innovation;

accumulate the calculated test statistic at a plurality of monitors, wherein each monitor of the plurality of monitors is configured to accumulate calculated test statistics over a predefined time period that is different than predefined time periods of one or more other monitors of the plurality of monitors;

compare each accumulated test statistic with a pre-defined threshold associated with the respective monitor, wherein each pre-defined threshold is based on a probability of false alarm, wherein the probability of false alarm represents a probability that the received one or more measurements do not contain faults;

in accordance with at least one of the accumulated test statistics exceeding the associated pre-defined threshold:

alert a user of the device to the presence of a fault with the received one or more measurements; and permanently withhold the received one or more measurements from being transmitted to a Kalman filter, wherein the Kalman filter produces an estimate of a value based on previous estimates of the value and the one or more measurements received from the one or more sensors; and in accordance with none of the accumulated test statistics exceeding the associated pre-defined thresholds:

transmit the received one or more measurements to the Kalman filter.

2. The device of claim 1, wherein the calculated innovation is based on a difference between the one or more received measurements and the expected value of the one or more received measurements.

3. The device of claim 1, wherein the noise information about the calculated innovation includes a covariance matrix of the innovation.

4. The device of claim 3, wherein the noise information includes a covariance matrix of the innovation, and wherein the test statistic is calculated by multiplying the calculated innovation with the covariance matrix of the innovation.

5. The device of claim 1, wherein each monitor of the plurality of monitors accumulates the test statistics over a predefined period of time set by a user of the device.

6. The device of claim 5, wherein each monitor can generate updated test statistics based on a predefined number of received measurements, and wherein the predefined number of received measurements is set by the user of the device.

7. The device of claim 1, wherein the one or more received measurements are received from a GPS transmitter.

8. A method for detecting and rejecting faulty data in an estimation scheme, the method comprising:

receiving one or more measurements from one or more sensors at an input;

calculating an innovation based on the one or more received measurements, wherein an innovation is based on the received one or more measurements and an expected value of the one or more received measurements;

calculating a test statistic based on the calculated innovation, wherein the calculated test statistic is based on the calculated innovation and noise information about the calculated innovation;

accumulating the calculated test statistic at a plurality of monitors, wherein each monitor of the plurality of monitors is configured to accumulate calculated test statistics over a predefined time period that is different than predefined time periods of one or more other monitors of the plurality of monitors;

comparing each accumulated test statistic with a pre-defined threshold associated with the respective monitor, wherein each pre-defined threshold is based on a probability of false alarm, wherein the probability of false alarm represents a probability that the received one or more measurements do not contain faults;

in accordance with at least one of the accumulated test statistics exceeding the associated pre-defined threshold:

alerting a user of the device to the presence of a fault with the received one or more measurements; and permanently withholding the received one or more measurements from being transmitted to a Kalman filter, wherein the Kalman filter produces an estimate of a value based on previous estimates of the value and the one or more measurements received from the one or more sensors; and in accordance with none of the accumulated test statistics exceeding the associated pre-defined thresholds:

transmitting the received one or more measurements to the Kalman filter.

9. The method of claim 8, wherein the calculated innovation is based on a difference between the one or more received measurements and the expected value of the one or more received measurements.

10. The method of claim 8, wherein the noise information about the calculated innovation includes a covariance matrix of the innovation.

11. The method of claim 10, wherein the noise information includes a covariance matrix of the innovation, and wherein the test statistic is calculated by multiplying the calculated innovation with the covariance matrix of the innovation.

12. The method of claim 8, wherein each monitor of the plurality of monitors accumulates the test statistics over a predefined period of time set by a user of the device.

13. The method of claim 12, wherein each monitor can generate updated test statistics based on a predefined number of received measurements, and wherein the predefined number of received measurements is set by the user of the device.

14. The method of claim 8, wherein the one or more received measurements are received from a GPS transmitter.

15. A non-transitory computer readable storage medium storing one or more programs, the one or more programs comprising instructions for detecting and rejecting faulty data in an estimation scheme, when executed by the portable electronic device causes the portable electronic device to:

receive one or more measurements from one or more sensors at the input;

calculate an innovation based on the one or more received measurements, wherein an innovation is based on the received one or more measurements and an expected value of the one or more received measurements;

calculate a test statistic based on the calculated innovation, wherein the calculated test statistic is based on the calculated innovation and noise information about the calculated innovation;

accumulate the calculated test statistic at a plurality of monitors, wherein each monitor of the plurality of monitors is configured to accumulate calculated test statistics over a predefined time period that is different than predefined time periods of one or more other monitors of the plurality of monitors;

compare each accumulated test statistic with a pre-defined threshold associated with the respective monitor, wherein each pre-defined threshold is based on a probability of false alarm, wherein the probability of false alarm represents a probability that the received one or more measurements do not contain faults;

in accordance with at least one of the accumulated test statistics exceeding the associated pre-defined threshold:

alert a user of the device to the presence of a fault with the received one or more measurements; and permanently withhold the received one or more measurements from being transmitted to a Kalman filter, wherein the Kalman filter produces an estimate of a value based on previous estimates of the value and the one or more measurements received from the one or more sensors; and in accordance with none of the accumulated test statistics exceeding the associated pre-defined thresholds;

transmit the received one or more measurements to the Kalman filter.

16. The non-transitory computer readable storage medium of claim 15, wherein the calculated innovation is based on a difference between the one or more received measurements and the expected value of the one or more received measurements.

17. The non-transitory computer readable storage medium of claim 15, wherein the noise information about the calculated innovation includes a covariance matrix of the innovation.

18. The non-transitory computer readable storage medium of claim 17, wherein the noise information includes a covariance matrix of the innovation, and wherein the test statistic is calculated by multiplying the calculated innovation with the covariance matrix of the innovation.

19. The non-transitory computer readable storage medium of claim 15, wherein each monitor of the plurality of monitors accumulates the test statistics over a predefined period of time set by a user of the device.

20. The non-transitory computer readable storage medium of claim 19, wherein each monitor can generate updated test statistics based on a predefined number of received measurements, and wherein the predefined number of received measurements is set by the user of the device.

21. The non-transitory computer readable storage medium of claim 15, wherein the one or more received measurements are received from a GPS transmitter.

* * * * *